US009481263B2

(12) United States Patent
Ebert et al.

(10) Patent No.: US 9,481,263 B2
(45) Date of Patent: Nov. 1, 2016

(54) METHOD FOR OPERATING A VEHICLE

(76) Inventors: Klaus Ebert, Berlin (DE); Stefan Meyer, Berlin (DE)

( * ) Notice: Subject to any disclaimer, the term of this patent is extended or adjusted under 35 U.S.C. 154(b) by 143 days.

(21) Appl. No.: 14/009,836

(22) PCT Filed: Mar. 29, 2012

(86) PCT No.: PCT/EP2012/055615
§ 371 (c)(1),
(2), (4) Date: Feb. 6, 2014

(87) PCT Pub. No.: WO2012/136556
PCT Pub. Date: Oct. 11, 2012

(65) Prior Publication Data
US 2014/0156127 A1    Jun. 5, 2014

(30) Foreign Application Priority Data

Apr. 7, 2011 (DE) .................. 10 2011 016 357
Apr. 18, 2011 (DE) .................. 10 2011 017 464

(51) Int. Cl.
*B60L 15/20* (2006.01)
*B60L 3/00* (2006.01)
(Continued)

(52) U.S. Cl.
CPC .......... *B60L 15/2036* (2013.01); *B60L 3/0061* (2013.01); *B60L 3/0084* (2013.01);
(Continued)

(58) Field of Classification Search
CPC combination set(s) only.
See application file for complete search history.

(56) References Cited

U.S. PATENT DOCUMENTS 6,388,416 B1   5/2002   Nakatani et al. ............. 318/700
8,110,950 B2   2/2012   Moriyama et al. ........ 310/12.31
(Continued)

FOREIGN PATENT DOCUMENTS

DE    26 51 594       5/1978    .............. B62D 1/02
DE    195 40 067      4/1997    ............. B60K 28/16
(Continued)

OTHER PUBLICATIONS

The International Search Report (in English), dated Dec. 12, 2012, the Written Opinion of the International Searching Authority (in English), dated Oct. 7, 2013, and the International Preliminary Report on Patentability (in English), dated Oct. 8, 2013 which issued from the ISA/European Patent Office for corresponding PCT Application No. PCT/EP2012/055615 filed on Mar. 29, 2012.
(Continued)

*Primary Examiner* — Thomas G Black
*Assistant Examiner* — Ana Thomas
(74) *Attorney, Agent, or Firm* — Gerald T. Bodner

(57) ABSTRACT

A method for operating a vehicle which has at least one steered axle and at least one driven axle, wherein at least the driven axle has at least two wheel-hub electric motors that are integrated in the respective drive wheel. In addition, an electronic control unit (BLDC controller module 1, BLDC controller module 2) is provided for the wheel-hub motors (wheel-hub motor 1, wheel hub motor 2) forming an electronic differential. Sensors detect signals (Hall signals) that correspond to the driving defaults. Correction factors for default values for controlling the wheel-hub motors are determined from the sensor signals (speed), the position of the accelerator pedal (gas pedal) or accelerator throttle and the steering angle (steering angle generator) by an interface module and the factors are forwarded to the relevant motor control units (BLDC controller module 1, BLDC controller module 2).

5 Claims, 8 Drawing Sheets

(51) Int. Cl.
*B60L 3/04* (2006.01)
*B60L 3/10* (2006.01)
*B60L 15/02* (2006.01)

(52) U.S. Cl.
CPC .............. *B60L 3/04* (2013.01); *B60L 3/102* (2013.01); *B60L 3/106* (2013.01); *B60L 3/108* (2013.01); *B60L 15/025* (2013.01); *B60L 15/2072* (2013.01); *B60L 2220/16* (2013.01); *B60L 2220/44* (2013.01); *B60L 2240/24* (2013.01); *B60L 2240/421* (2013.01); *B60L 2250/26* (2013.01); *Y02T 10/643* (2013.01); *Y02T 10/648* (2013.01); *Y02T 10/7275* (2013.01)

(56) References Cited

U.S. PATENT DOCUMENTS

2007/0138887 A1* 6/2007 Tonoli .................. B60K 6/48
  310/112
2008/0095404 A1* 4/2008 Abercrombie ....... G06K 9/4633
  382/104
2010/0004090 A1* 1/2010 Mizutani ................ B60K 6/52
  477/7

FOREIGN PATENT DOCUMENTS

| DE | 100 37 972 | 3/2001 | ................ H02P 6/18 |
| DE | 10 2004 014 773 | 2/2005 | ................ B60K 7/00 |
| DE | 103 32 228 | 2/2005 | ................ H02P 6/18 |
| DE | 11 2004 002 360 | 3/2008 | ............. H02K 41/03 |
| DE | 10 2009 030 816 | 11/2010 | ................ B60L 7/26 |
| EP | 1 798 093 | 6/2007 | ................ B60K 7/00 |
| WO | WO 98/19875 | 5/1998 | ................ B60G 7/00 |

OTHER PUBLICATIONS

Official Communication from the Patent Office in Germany, an Office Action, (in German) dated Jan. 2, 2013, for priority German Patent Application No. DE 10 2011 017 464.8, filed on Apr. 18, 2011.

\* cited by examiner

METHOD FOR OPERATING A VEHICLE

CROSS-REFERENCE TO RELATED APPLICATIONS

Not Applicable

STATEMENT REGARDING FEDERALLY SPONSORED RESEARCH OR DEVELOPMENT

Not Applicable,

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION (1) Field of the Invention

The invention relates to a method for operating a vehicle comprising at least one steered axle and at least one driven axle, wherein at least the driven axle has at least two electric wheel hub motors which are integrated in the respective drive wheel, further with the aid of an electronic control unit for the wheel hub motors, forming an electronic differential, and on the basis of sensor signals which correspond to the driving presettings, according to the preamble of patent claim 1.

(2) Description of Related Art

Until now, usually the conventional path has been chosen for the construction of electric vehicles, which is strongly guided by the construction of petrol-propelled vehicles. A single electric motor is used, which drives the rear wheels using a mechanical differential and a rear axle. While the electric motor itself is greatly effective the effectiveness of the electric drive as a whole is decreased by the occurring mechanical power losses, and the performance as well as the range of the vehicle are thus reduced. If one attempts to bypass these mechanical losses one arrives, as a last consequence, at the wheel hub motor, which represents a special form of a three-phase, brushless direct-current motor (BLDC motor) 100. These motors are installed, together with a suitable control unit, for instance in two-wheeled electric scooters, while the use in vehicles having two or more directly driven wheels is problematical. According to the prior art a separate control unit would have to be provided for each motor which results in synchronization problems. With different loads on the drive wheels, e.g. on varying grounds or upon cornering, the control units not only have to react on the target presetting of the driver, but also on the condition of the respectively other control unit. If this is disregarded the driving situation may become unsafe, the vehicle may break away, etc., so that the safety is no longer guaranteed.

BLDC motors are formed of a stationary, annular arrangement of coils (the stator) and an equally annular arrangement of permanent magnets (the rotor) which is rotatably mounted and rotates around the coils (see FIG. 1). The motor can be actuated by applying a voltage to appropriate coils so that the rotor is dragged a bit further by the so generated magnetic field. In most cases these motors have a three-phase configuration, viz. there are three groups of coils, and also three connections 110, 112, 114 which are led out of the motor and are designated with U, V and W. The control unit supplying these three connections with voltage has to ensure that the suitable magnetic fields are generated at each moment so at to allow a regular running of the motor. To be capable of carrying out this switching at the right moment and react on load changes, respectively, it is necessary to obtain positional information of the motor. These information are usually supplied by three Hall sensors 102 whose signals 104 are evaluated by the control unit and serve in the determination of the switching moments of the motor connections. The realization of a linear motor complying with the above principle is described, for instance, in the patent document DE 11 2004 002 360 T5.

The three connections U, V and W of the respectively used motor may be connected to both the positive and negative pole of the voltage source by a half-bridge circuit 106 of power semiconductors in each case (see FIG. 2). It has to be made sure that both transistors 108 of a half-bridge 106 do not open simultaneously at any time since this would result in a short circuit and the destruction of the transistors 108. In order to allow the varying of the performance, respectively speed of the motor, basically, the voltage could be changed. However, as the voltage source is predefined and a corresponding controlling of the switching semiconductors would lead to enormous losses in the semiconductors this method is impossible to realize.

Instead, the voltage is pulsed, i.e. switched on and off in very quick succession. Thus, the power loss in the semiconductors is minimized as these are either completely blocking or completely opened. This pulse width modulation (PWM) allows a fine controlling of the motor performance. The optimum switching frequency depends on the semiconductors used and the characteristics of the respective motor. If the frequencies are too high, the switching losses are increased. If the frequencies are too low, audible oscillations may occur and reduce the driving comfort.

The most simple method of controlling a BLDC motor 100 consists in applying a voltage to two of the three motor connections 110, 112, 114 and logically advancing same according to the positional information from the Hall sensors 102. The PWM is thereby realized with pulses having a constant width, corresponding to the required power (see FIG. 3). Owing to the rough switching between the three phases this method, called block controlling, leads to a comparably high noise development which is unpleasantly noticeable in vehicles, and also is an indication of energy losses.

The most optimum controlling of a rotating motor is realized by a sinusoidal modulated signal. The strict separation in terms of time between the individual controlling phases is not necessary. Each of the three connections 110, 112, 114 is controlled (by the PWM) with a sinusoidal signal 116. The three signals are each phase-shifted relative to each other by 120° (see FIG. 4). As the generated magnetic field rotates continuously the motor runs considerably smoother as compared to the block controlling 118. Moreover, as compared to the block operation, energy of up to 10% is saved.

Although the generation of such a sinusoidal signal 116 is more complex it can be accomplished without problems by a microcontroller. A knowledge of the current position of the motor 100 which is more precise as compared to that directly supplied by the Hall sensors 102 is necessary. Therefore, the generation of the sinusoidal signals 116 has to be synchronized with the signals of the Hall sensors 102. When the motor 100 starts running and this synchronization has not yet been performed, therefore, the block controlling 118 is applied first. After a few signals from the Hall sensors 102, when the position is known with enough accuracy, a switchover to the actual sine control 116 takes place (see step S26 in the flow diagram according to FIG. 5). Before a change of the direction of rotation of the motor 100 it has to be ensured first that the motor is in a standstill.

More specifically, FIG. 5 shows a flow diagram for controlling the motors based on a block operation in the start-up, up to a quieter sine operation during the driving. In accordance with the method, the flow begs with a start step (Step S21). Then, it is determined whether the motor is at a stand-still (Step S22). If the motor is not at a stand-still, the flow returns to the start step (Step S21). However, if the motor is at stand-still, then block operation is applied (Step S23).

After block operation is applied in Step S23, it is determined whether there has been a change of direction of the motor (Step S24). If yes, then the flow returns to the start step (Step S21). However, if there has been no change of direction, it is determined whether synchronization has been performed (Step S25). If no, the flow of the method returns to Step S23 and block operation is applied. If it is determined that synchronization has been performed, sine operation takes place (Step S26).

After sine operation takes places in Step S26, another determination is made as to whether there has been a change in direction of the motor (Step S27). If no, then the flow of the method returns to Step S26 and sine operation continues. However, if a change in direction is determined, the flow of the method returns to the start step (Step S21).

The BLDC control unit requires a signal by means of which it sets the motor 100 in motion. This signal may, in the simplest case, be formed of an analog voltage to supply the motor with power according to a characteristic curve. Also, control units may include a digital interface. In addition, control units may be operated in two different modes, respectively be switched between same. In one mode the control unit is provided with a motor performance presetting. In this case, the presetting has a direct effect on the amplitude of the sinusoidal signal 116, respectively the width of the PWM signals and, thus, on the outputted electrical power, while the rotational speed behaves approximately reciprocally with respect to the mechanical load of the motor 100. This corresponds to the driving experience one is accustomed to and knows from the motor vehicle. If the route goes uphill, for instance, the gas pedal has to be pressed continuously to maintain the speed because a higher performance is required. In the other mode the control unit is provided with a presetting for the motor speed and attempts by means of an internal adjustment to reach and maintain this speed.

A drive device for an industrial truck is known from the prior art according to DE 10 2004 014 773 A1, which comprises a center pivot plate rotatable about a vertical axis, two drive wheels mounted on the center pivot plate in parallel and mirror-symmetrically to the vertical axis, and a device for generating a differential effect between the drive wheels arranged axially between the drive wheels. According to one embodiment each drive wheel is coupled to an own motor which is designed as a wheel hub motor. If electric motors are used, forming an electric differential, the differential effect between the two drive wheels is generated purely electrically, so that a mechanical differential is no longer necessary. Details about the controlling and configuration of such an electric or electronic differential are, however, not provided in DE 10 2004 014 773 A1. Also, due to the additional motor and the mechanical system associated therewith, this solution requires a greater expenditure, which is entirely avoided by the invention introduced herein.

BRIEF SUMMARY OF THE INVENTION

Based on the foregoing it is, therefore, the object of the invention to provide a further developed method for operating a vehicle comprising at least one steered axle and at least one driven axle, wherein at least the driven axle has at least two electric wheel hub motors 122, 124 which are integrated in the respective drive wheel. According to the invention a simple and reliable electronic control unit for the wheel hub motors, forming an electronic differential, is to be realized, so that a safe driving of electric vehicles having several wheel hub motors and directly driven wheels is possible.

The solution to the object of the invention is achieved by a method according to the teaching of patent claim 1. The dependent claims represent at least useful embodiments and further developments.

Thus, there is proposed a method for operating a vehicle comprising at least one steered axle and at least one driven axle, wherein at least the driven axle has at least two wheel hub motors which are integrated in the respective drive wheel. Further, an electronic control unit for the wheel hub motors is provided, wherein an electronic differential is formed. According to the method sensor signals are used which correspond to the respective driving presettings, in particular the driving speed.

According to the invention an interface module 126 is provided, which determines correction factors for the preset values for controlling the wheel hub motors 122, 124 from the sensor signals of the position of the accelerator pedal and the steering arm, and forwards same to the relevant motor control units 128, 130 which are preferably configured as BLDC control unit.

In a preferred embodiment, the respective current rotational speed values of the motors 122, 124 can be determined and supplied to the interface module 126 to determine the preset values.

The center distance and the axle width are determined for each vehicle onetime and are provided for determining the correction factors.

In one embodiment of the invention cornering results in an automatic limitation of the maximum driving speed, which increases the driving safety.

According to another embodiment of the solution according to the invention, in the event of a defect of one of the motor control units 128, 130 and/or a breakdown of a motor 122, 124, the interface module 126 may render the relevant path inoperative and the drive of the vehicle may be continued merely with the intact wheel comprising control unit and motor.

The interface module 126 ensures that the motor control unit 128, 130 is block-operated in the start-up and sine-operated in the subsequent normal driving operation.

If the blocking or spinning of a respective driven wheel is detected a power adaptation may be realized both for the respective wheel and the other driven wheel of the respective axle.

The invention introduced herein solves the aforementioned problems in electric vehicles which have several wheels directly driven by wheel hub motors. The method called dual motor control combines two BLDC control units 128, 130 and one central interface module 126 to one unit. The BLDC control units 128, 130 each operate one BLDC motor 122, 124, i.e. they supply the U, V and W signals 110, 112, 114 for the motor 122, 124 via a power driver stage and additionally evaluate the Hall sensor signals 104 coming from the motor 122, 124.

The target presettings are no longer provided to the control units 128, 130 directly by the gas pedal or the like, but by the interface module 126. Same also evaluates the return information about the exact rotational speed, the power consumption and possible error messages coming from the control units. These information from the control units 128, 130 are included when the interface module 126 generates, on the basis of the driver's presettings, the presettings for the control units. In addition to the required power, which the driver predefines via the gas pedal (or the accelerator throttle etc.), in particular the driving direction is included which is supplied to the dual motor control unit 132 by a steering angle transmitter 134 coupled to the vehicle steering. Other general status data, such as the battery state of charge, are incorporated as well. The output obtained is the actual current speed which can be displayed by a speed indicator or on a display, and status information which, if desired or required, can likewise be evaluated.

One task of the interface module is that of the electronic differential. By the construction-related omission of the rear axle 136 and the mechanical differential the function thereof is reproduced in an electronic way. While the use of a mechanical differential results in a compensation ensuing from the frictional forces occurring on the wheels, the dual motor control unit 132 calculates this on the basis of the steering angle and forwards same to the individual control units in the form of different presettings. This calculation moreover requires not only the variable steering angle, but other constants which have to be programmed in the control unit onetime before the operation is started.

The basis of the calculation is the curve radius pertaining to a specific steering angle $\phi$, relating to the vehicle center. It is immediately recognizable by means of FIG. 7 that the center distance a is included as another quantity. The directly obtained result is:

$$r = a \cdot \tan(90° - \phi)$$

Attention should be paid to the pole at $\phi=0$, which is eliminated below. The correction factors for the rotational speed, respectively speed are determined using width b of the axle by $$\frac{ri}{r} = \frac{r - \frac{b}{2}}{r}$$

$$= 1 - \frac{b}{2r}$$

$$= 1 - \frac{b}{2a \cdot \tan(90° - \phi)}$$

$$= 1 - \frac{b}{2a} \cdot \tan(\varphi)$$

for the motor on the inside of the curve, and correspondingly by $$\frac{ra}{r} = 1 + \frac{b}{2a} \cdot \tan(\varphi)$$

for the motor on the outside.

The rotational speed, respectively power required for the current speed presetting is multiplied by ri/r, respectively ra/r for the respective motor, and forwarded by the interface module 126 to the corresponding control units 128, 130. The pole from the first equation is removed by the quotient formation, i.e. $\phi=0$ is tan $(\phi)=0$, and the calculation of both correction factors results in 1, as expected. As the steering angle is, at any rate, clearly smaller than 90° no mathematical problems will occur.

As permanently excited motors work as generators in a coasting condition kinetic energy of the vehicle can be fed back into the battery in the form of electric energy. A power output stage includes diodes integrated in the transistors used. Alternatively, suitable diodes could be additionally integrated in the output stage. These are blocking in normal operation owing to their orientation. However, if the gas pedal is withdrawn wholly or in part during the driving the motor initially rotates at a speed higher than the presetting. Consequently, a voltage higher than the one supplied from the outside is induced in the motor, resulting in a recovery. By the electrical load on the motor, which is now working as a generator, the motor and, thus, the vehicle is decelerated without the complete transformation of the kinetic energy of the vehicle into heat. At least a portion thereof is fed back into the battery, viz a so-called regenerative braking is realized.

The invention will be explained in more detail below by means of an embodiment and with the aid of figures.

BRIEF DESCRIPTION OF THE SEVERAL VIEWS OF THE DRAWINGS(S)

Figure 1:
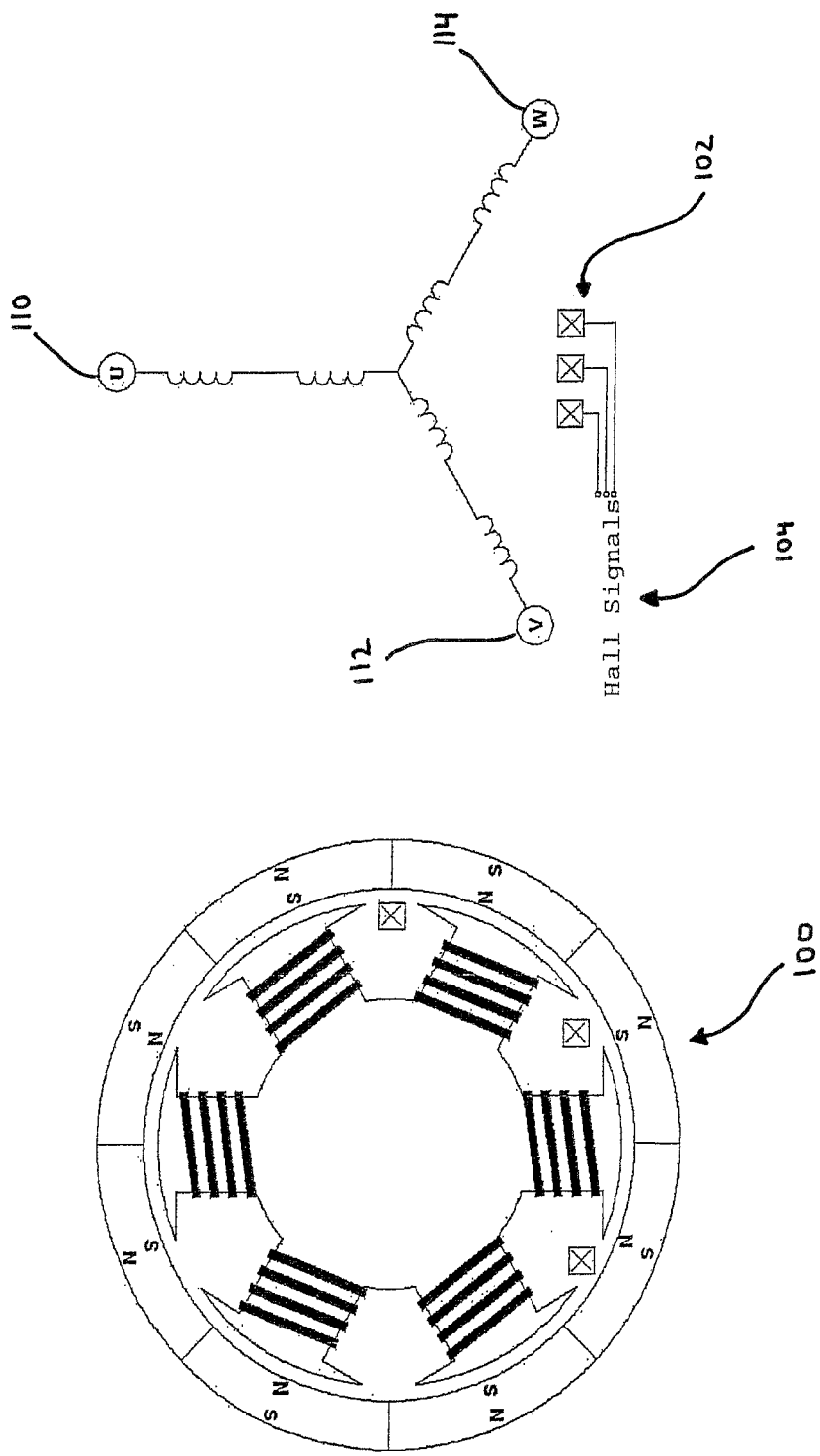
FIG. 1 shows a basic structure of a BLDC motor, formed of a stationary, annular arrangement of coils as stator and an equally annular arrangement of permanent magnets as rotor, and the interconnection of the coils to the connections of the U, V and W phases.
Figure 2:
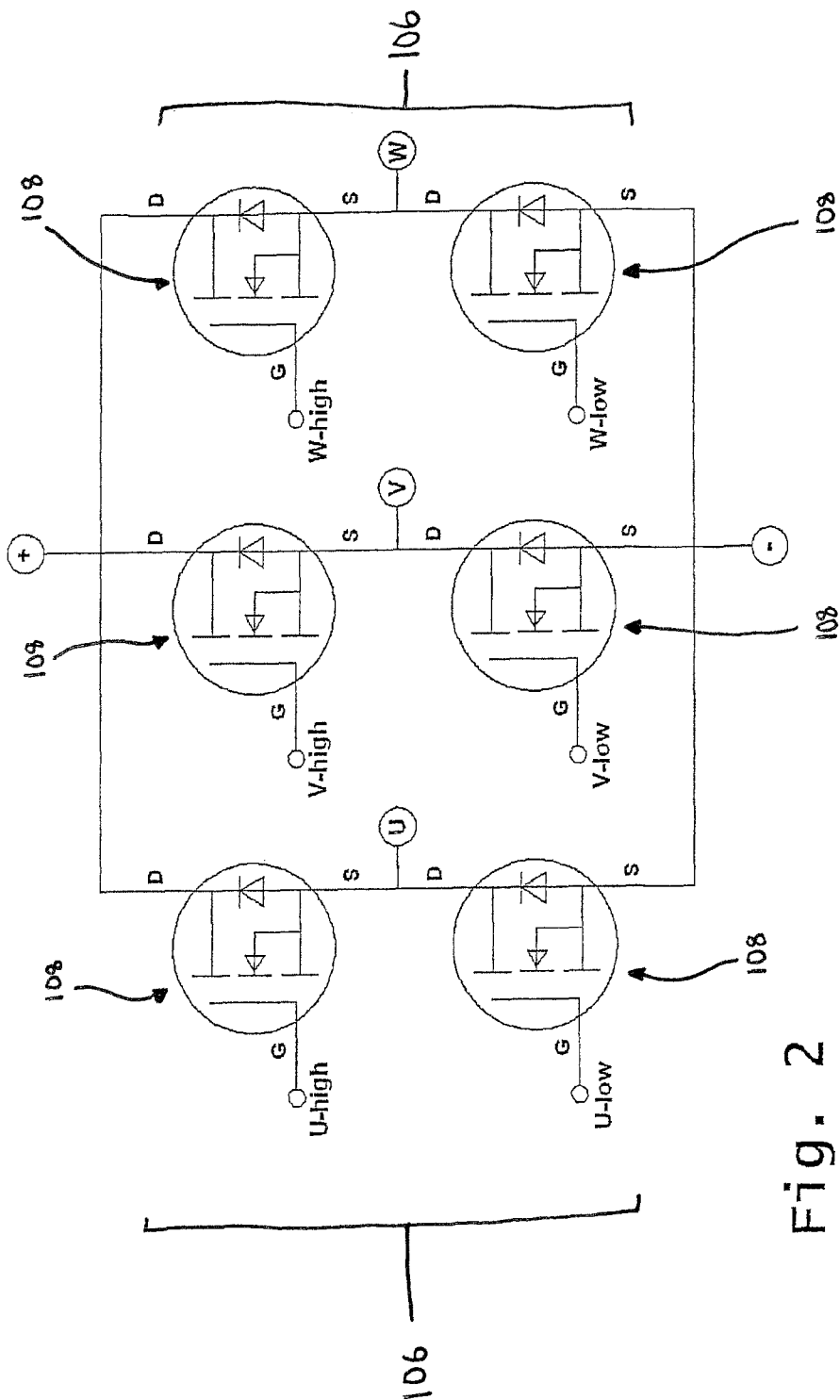
FIG. 2 shows a schematic circuit for controlling a BLDC motor on the basis of power/field effect transistors.
Figure 3:
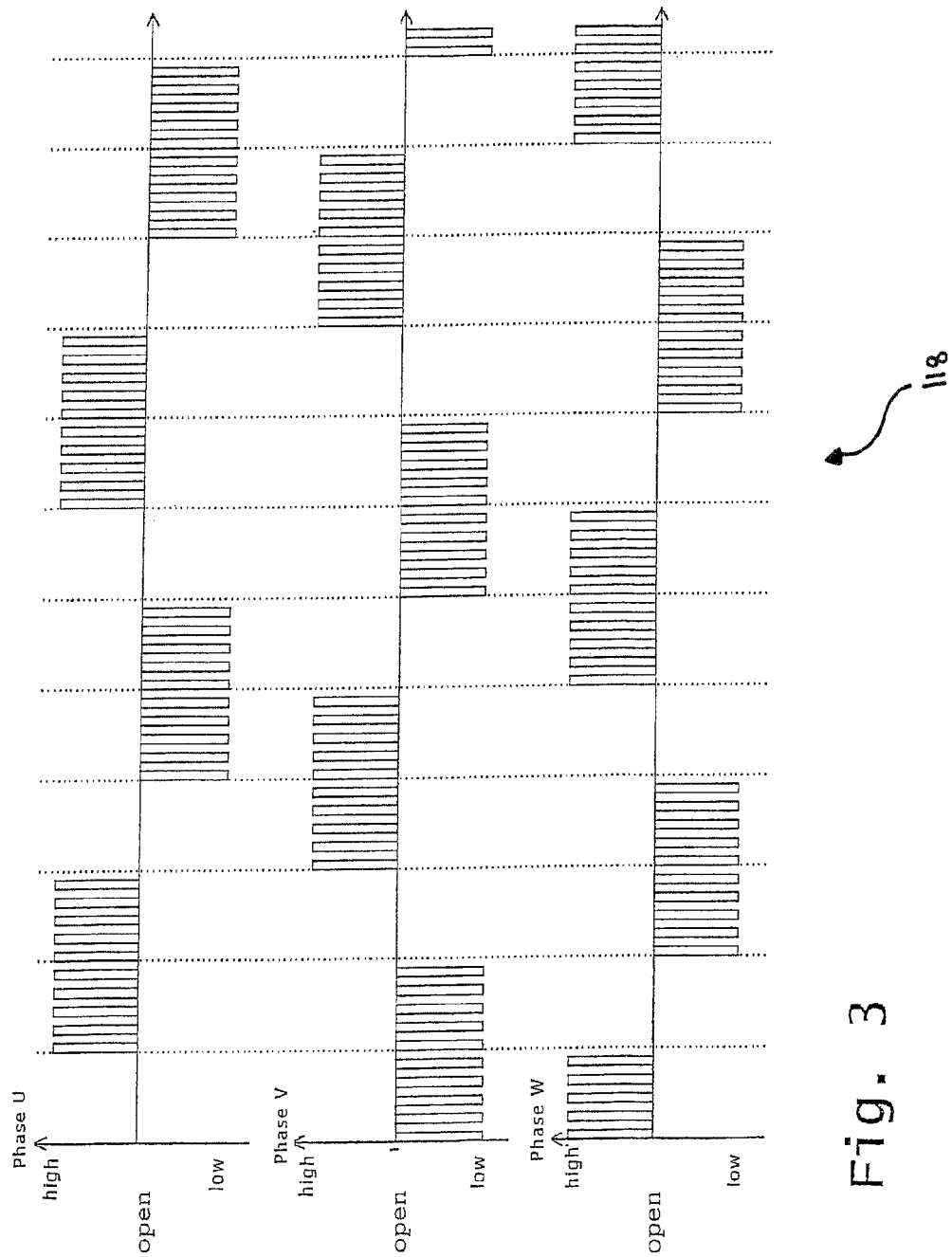
FIG. 3 shows the parameter phases U, V and W for the block operation of a BLDC motor.
Figure 4:
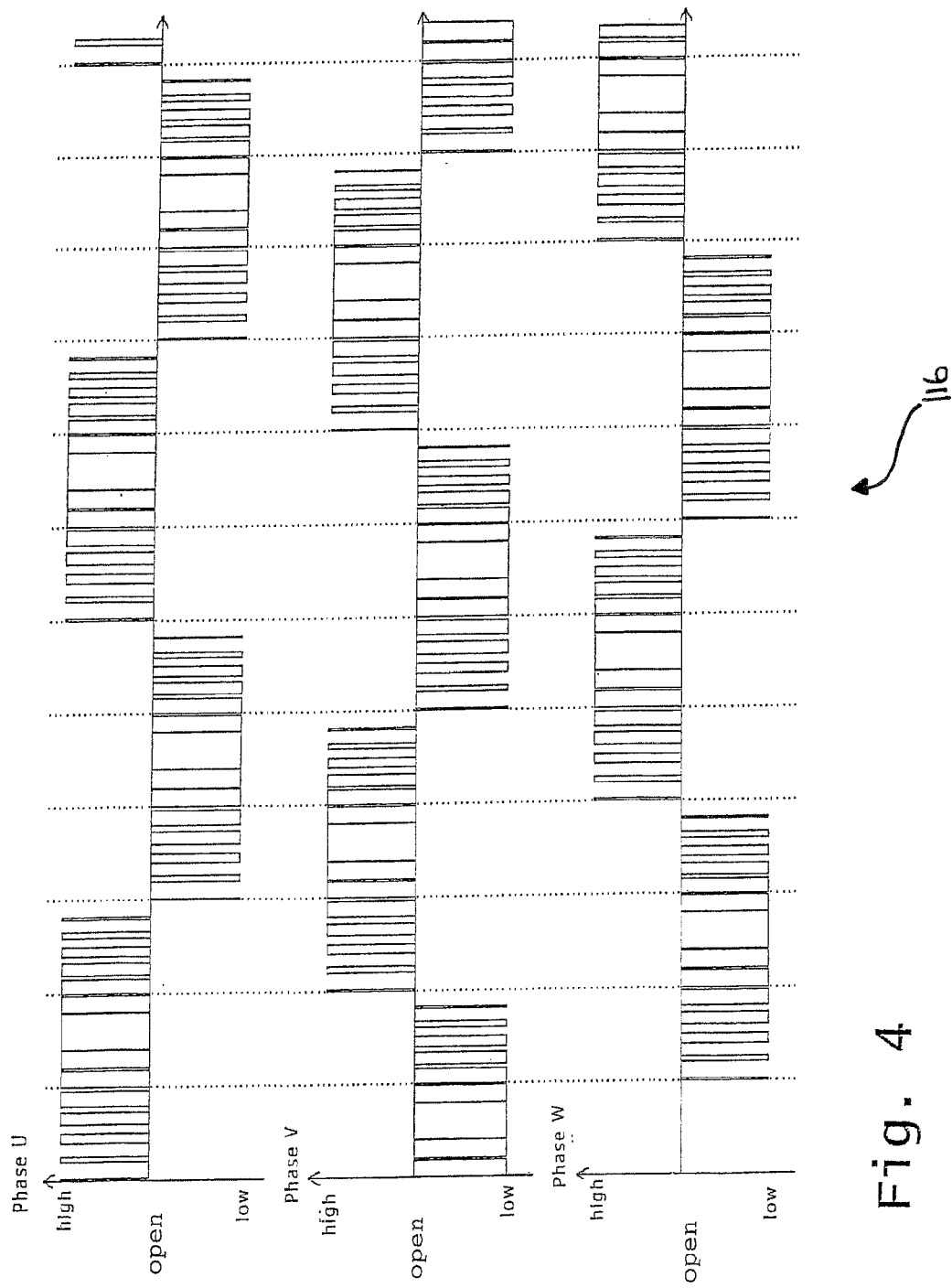
FIG. 4 shows an illustration of the phases U, V and W for the sine operation of BLDC motors.
Figure 5:
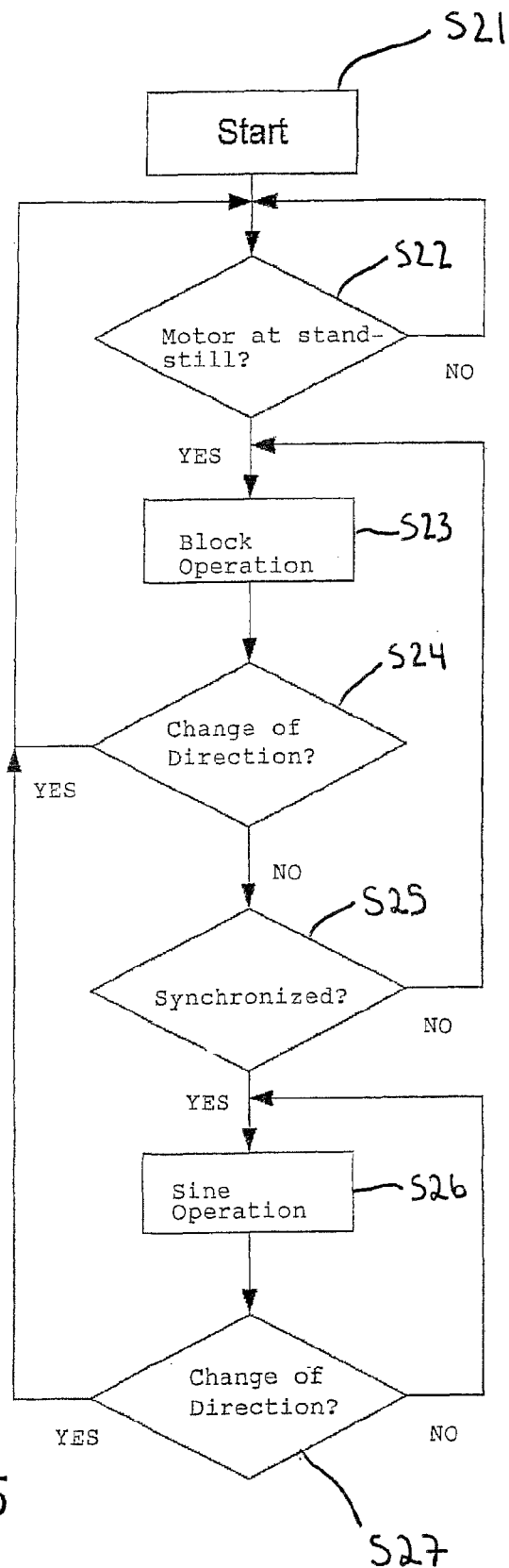
FIG. 5 shows a flow diagram for controlling the motors based on a block operation in the start-up, up to a quieter sine operation during the driving.
Figure 6:
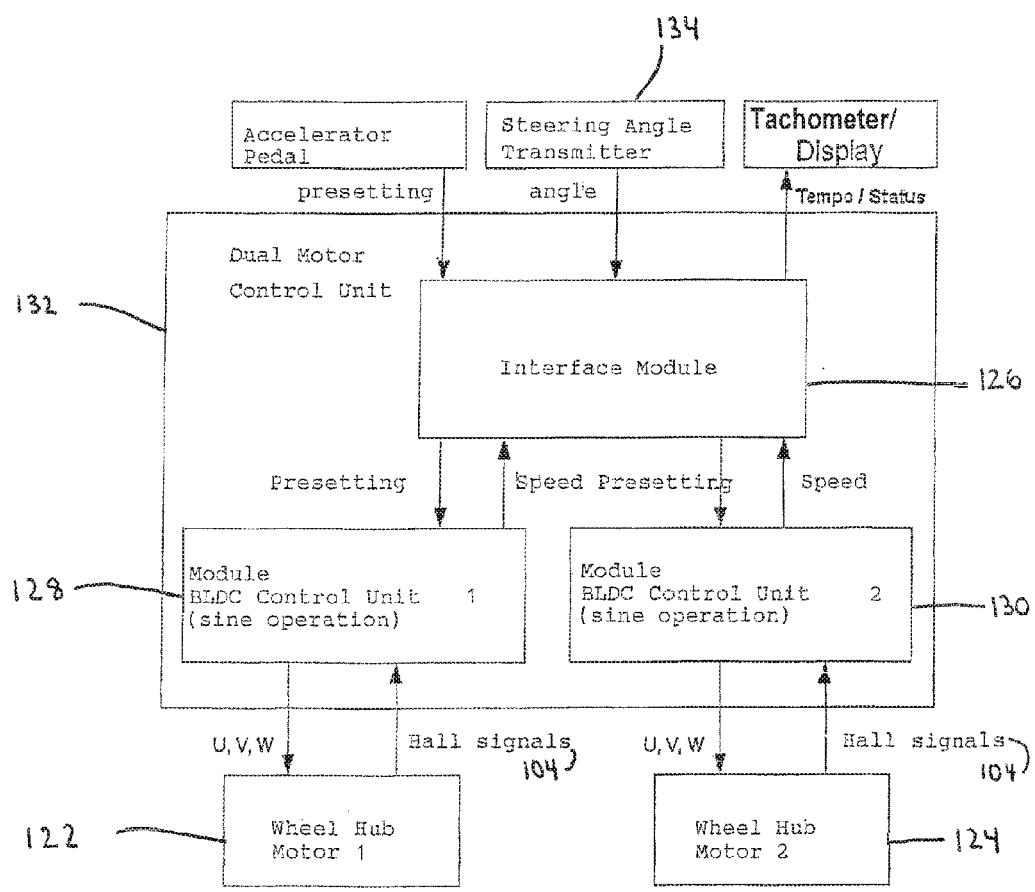
FIG. 6 shows a block diagram of the structure of an arrangement according to the invention for implementing the method according to the invention.
Figure 7:
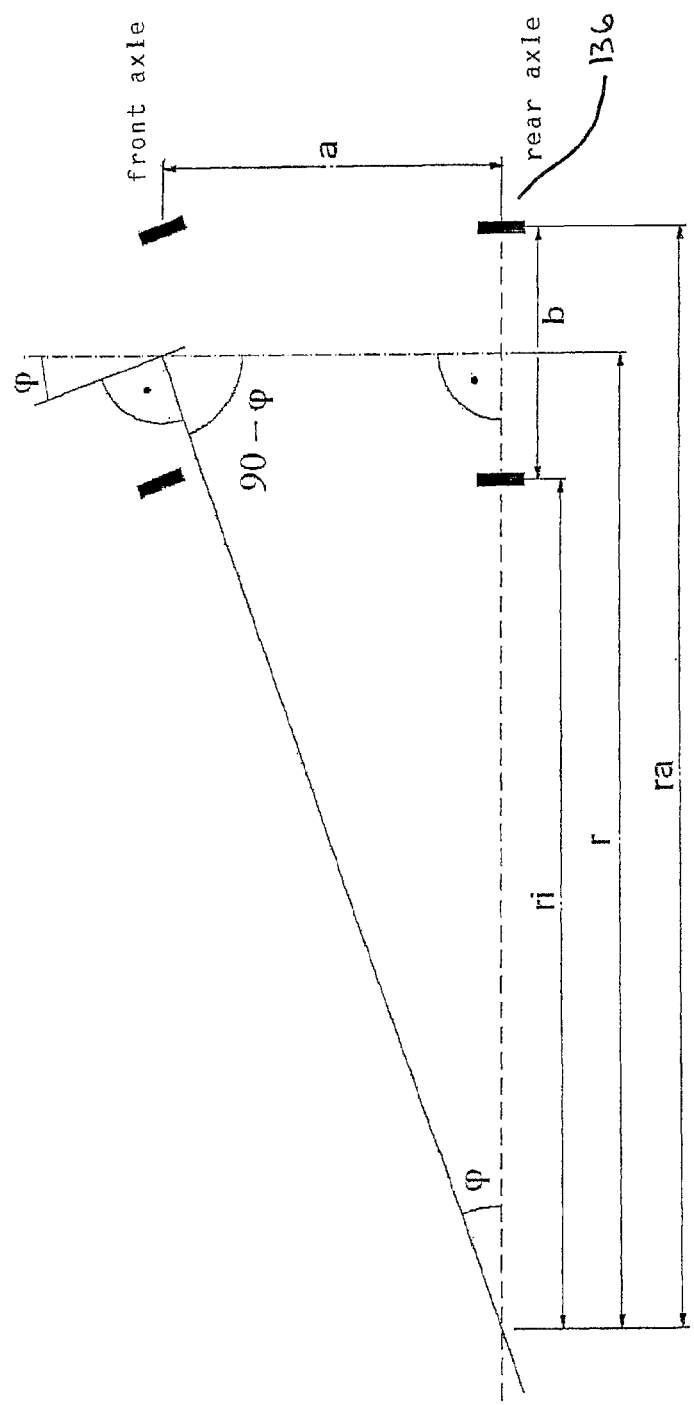
Figure 8:
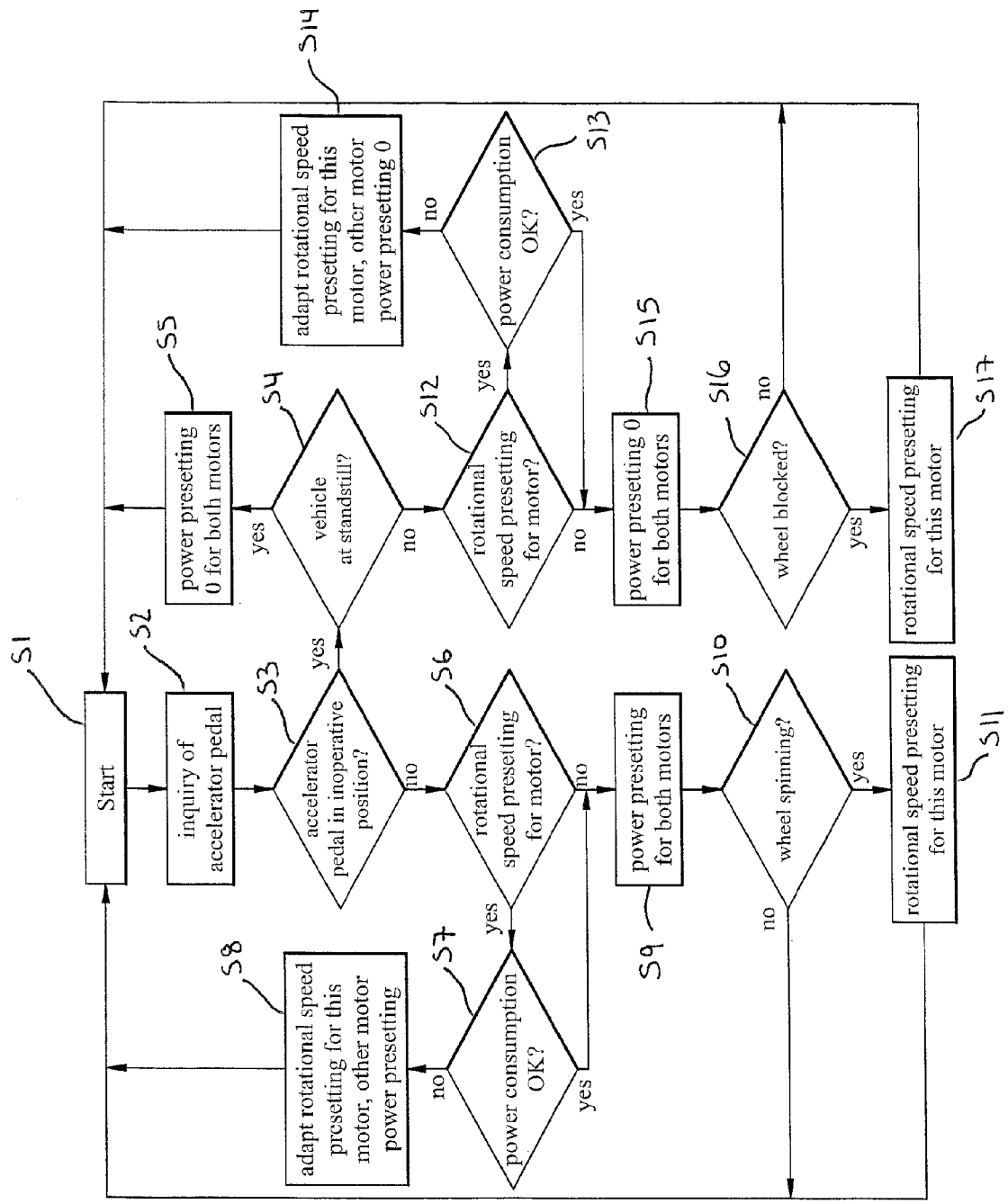

FIG. 7 shows an illustration forming the basis for calculating the curve radii pertaining to a specific steering angle, relating to the vehicle center; and FIG. 8 shows a flow diagram of the method according to the invention to explain the functions of the interface module. In accordance with the method, the flow beings with a start step (Step S1). Then, an inquiry of the position of the accelerator pedal is made (Step S2). It is determined if the accelerator pedal is in an inoperative position (Step S3). If yes, then another determination is made as to whether the vehicle is at standstill (Step S4). If the vehicle is at standstill, then the power is preset to 0 for both motors (Step S5), and then the flow returns to the start step (Step S1).

If the accelerator pedal is not in an inoperative position, then the flow of the method goes to a step where it is determined whether there is a rotational speed presetting for the motor (Step S6). If there is a rotational speed presetting for the motor, then a determination is made as to whether power consumption is okay (Step S7). If power consumption is not okay, then the method adapts the rotational speed presetting for this motor, and other motor power presetting (Step S8). Then, the flow of the method returns to the start step (Step S1). If power consumption is okay, then the flow of the method causes a power presetting to be made for both motors (Step S9). Then, a determination is made as to whether a wheel is spinning (Step S10). If a wheel is not spinning, then the flow of the method returns to the start step (Step S1). However, if a wheel is spinning, then a rotational speed presetting is made for this motor (Step S11). After that, the flow of the method returns to the start step (Step S1).

Returning to Step S6 in the flow of the method, if there is no rotational speed presetting for the motor, then a power presetting is made for both motors (Step S9), and the flow of the method continues to Step S10 to determine whether a wheel is spinning.

Returning now to the determination step (Step S4), if the vehicle is not at standstill, then a determination is made as to whether there is a rotational speed presetting for the motor (Step S12). If there is a rotational speed presetting for the motor, then a determination is made as to whether power consumption is okay (Step S13). If power consumption is not okay, then the method adapts the rotational speed presetting for this motor with the other motor power presetting at 0 (Step S14). Then, the flow of the method returns to the start step (Step S1). However, if power consumption is okay in the determination step (Step S13), then the power presetting is made to 0 for both motors (Step S15). Then, a determination is made as to whether the wheel is blocked (Step S16). If the wheel is not blocked, then the flow of the method returns to the start step (Step S1). However, if the wheel is blocked, then a rotational speed presetting is made for this motor (Step S17), and the flow of the method returns to the start step (Step S1).

Returning to the decision step (Step S12), if there is no rotational speed presetting for the motor, then the flow of the method continues to Step S15, and continues from there.

DETAILED DESCRIPTION OF THE INVENTION

As can be seen in FIG. 8 the most important function of the interface module 126 is the forwarding of the values preset by the driver to the individual control units 128, 130. To this end, the accelerator pedal, respectively a sensor of this type, and a steering angle transmitter 134 are inquired at short intervals, quasi-continuously or continuously.

The correction factors for the motors 122, 124 of the driven axle are then calculated from the steering angle and passed on to the respective individual motor control units 128, 130.

In normal operation power presettings are resulting therefrom for the control units 128, 130. The interface module 126 is able to limit the speed in narrow curves to prevent the vehicle from overturning.

In certain situations, however, special measures may be required. On the one hand, a driven wheel may spin if the ground is icy/greasy or slippery. In this case, the interface module 126 registers a suddenly increasing rotational speed and corrects same using a rotational speed presetting based on the rotational speed of the other, usually opposite wheel. If the drive wheel has grip again same is detected by means of the increased power consumption, and a switching back to defined preset values for the power takes place.

In the other case, in the event of a regenerative braking, a wheel may quickly come to a standstill due to the power decrease if it has no grip on a slippery ground and, therefore, is no longer kept in motion by the vehicle. In this case, too, a rotational speed presetting depending on the other wheel is realized until sufficient road adhesion is detected.

In the case of a defect of a motor, respectively one of the BLDC control units the interface module switches to emergency operation. Then, only the remaining, intact motor is used by means of which the vehicle can still be moved. Thus, it is possible to safely move the vehicle, for instance, to the edge of the road and remove it from the running traffic with a reduced power.

Like with the mechanical equivalent the electronic differential prevents an unnecessary friction of the wheel on the ground in curves. Thus, the road adhesion is improved at the same time as none of the wheels is forced to spin, as would be the case with a rigid connection of two drive wheels. In the event of regenerative braking, too, a similar stabilizing effect is obtained. The generated electric energy and, thus, the braking effect is at least approximately proportional to the speed of the motor. Thus, in the event of a regenerative braking in curves the braking effect in the outside wheel is greater than in the inside wheel. This behavior improves the directional stability of the vehicle, in particular upon braking in curves.

On slippery grounds, e.g. with ice or oil on the road, one wheel may easily spin or get blocked. In these cases the wheel in question is forced to maintain the correct speed. Under certain circumstances the adhesion is restored by this alone. If the adhesion is regained the wheel already has the required speed. Therefore, the vehicle cannot break away, which could be the case, for instance, with a blocked wheel.

Summarizing, the dual motor control unit 132 is designed as one unit which serves, on the one hand, to control several motors 122, 124 synchronously and, on the other hand, has the simplicity of an individual control with regard to the integration in the vehicle.

In comparison with an individual control only the necessary steering angle transmitter 134 is additionally required. All synchronizations required for the trouble-free cooperation of several motors are assumed by the dual motor control unit 132. When integrating it in a vehicle it is necessary to program onetime a set of parameters consisting of center distance and axle width prior to the start-up operation. In practice, the dual motor control unit 132 is constructed on the basis of one or several microcontrollers. It should be mentioned, however, that the aforementioned functionalities can, in principle, also be realized by means of analog circuits. For the communication between the individual modules both analog and digital signals may be used.

The preferred embodiment introduced herein for a two-axle vehicle with two driven rear wheels can be easily extended to a three-wheeled or four-wheeled vehicle driven with all wheels. The number of the BLDC control units integrated in the dual motor control unit can be readily extended to three, four or more. For a conventional vehicle with four wheels an alternative with four control units and four motors is ideal to increase the performance of the vehicle. It is necessary to correspondingly calculate and implement the correction factors for the individual control units, which is easily possible.

During the driving operation the dual motor control unit is characterized by a consistent safety concept which stabilizes the driving situation even in adverse conditions and offers a number of comfort functions.

What is claimed is:

1. Method for operating a vehicle comprising at least one steered axle and at least one driven axle, wherein at least the driven axle has at least two electric wheel hub motors which are integrated in the respective drive wheel, further with the aid of an electronic control unit for the wheel hub motors, forming an electronic differential, and on the basis of sensor signals which correspond to the driving presettings, whereby correction factors for the preset values for controlling the wheel hub motors are determined by an interface module from the sensor signals of the position of the accelerator pedal, respectively the sensor signals for the speed presetting and the steering angle, and are forwarded to the relevant motor control units, characterized in that the center distance and the axle width are determined for the vehicle and are provided for determining the correction factors, whereby the interface module ensures that the motor control unit is block-operated in the start-up when the vehicle is not moving and subsequently switched to be sine-operated when the vehicle is moving.

2. Method according to claim 1, characterized in that the respective current rotational speed values of the motors are determined and supplied to the interface module to determine the preset values.

3. Method according to claim 1, characterized in that cornering results in an automatic limitation of the maximum driving speed.

4. Method according to claim 1, characterized in that in the event of a defect of one of the motor control units and/or a breakdown of a motor the interface module renders the relevant path inoperative and the drive of the vehicle is continued merely with the intact path.

5. Method according to claim 1, characterized in that if the blocking or spinning of a respective driven wheel is detected a power adaptation is realized both for the respective wheel and the other driven wheel of the respective axle.

* * * * *